(12) United States Patent
Luo et al.

(10) Patent No.: US 7,680,340 B2
(45) Date of Patent: Mar. 16, 2010

(54) METHOD OF USING TEMPORAL CONTEXT FOR IMAGE CLASSIFICATION

(75) Inventors: Jiebo Luo, Pittsford, NY (US);
Matthew R. Boutell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 854 days.

(21) Appl. No.: 10/712,181

(22) Filed: Nov. 13, 2003

(65) Prior Publication Data

US 2005/0105775 A1 May 19, 2005

(51) Int. Cl.
*G06K 9/00* (2006.01)
*G06K 9/34* (2006.01)
*G06K 9/62* (2006.01)
*G06K 9/74* (2006.01)

(52) U.S. Cl. .................. 382/224; 382/228; 382/165; 382/173; 382/113

(58) Field of Classification Search ................ 382/224, 382/228, 165, 173, 113
See application file for complete search history.

(56) References Cited

U.S. PATENT DOCUMENTS

| | | | | |
|---|---|---|---|---|
| 6,606,411 | B1 * | 8/2003 | Loui et al. ................ | 382/224 |
| 6,774,917 | B1 * | 8/2004 | Foote et al. ............... | 715/700 |
| 6,977,679 | B2 * | 12/2005 | Tretter et al. ............ | 348/231.2 |
| 7,035,467 | B2 * | 4/2006 | Nicponski ................ | 382/224 |
| 7,165,029 | B2 * | 1/2007 | Nefian ...................... | 704/236 |
| 2002/0028021 | A1 * | 3/2002 | Foote et al. .............. | 382/224 |
| 2003/0002715 | A1 * | 1/2003 | Kowald ..................... | 382/118 |

FOREIGN PATENT DOCUMENTS

JP         09044639 A   *   2/1997
WO         WO 01/41064 A2       6/2001

OTHER PUBLICATIONS

Huang, J.—"Joint video scene segmentation and classification based on hidden Markov model"—IEEE—vol. 3, Aug. 2000, pp. 1551-1554.*
Simpson, J.—"A recurrent neural network classifier for improved retrievals of areal extent of snow cover"—IEEE—vol. 39, Oct. 2001, pp. 2135-2147.*
Huang, J.—"Integration of multimodal features for video scene classification based on HMM"—IEEE—Sep. 1999, pp. 53-58.*
Szummer, M.—"Indoor-outdoor image classification"—IEEE—Jan. 1998, pp. 42-51.*

(Continued)

*Primary Examiner*—Bhavesh M Mehta
*Assistant Examiner*—Bernard Krasnic
(74) *Attorney, Agent, or Firm*—David M. Woods; Justin D. Petruzzuli

(57) ABSTRACT

A method for improving scene classification of a sequence of digital images is disclosed herein. Such a method may include providing a sequence of images captured in temporal succession; (b) classifying each of the images individually based on information contained in the image alone to generate a first image classification; and (c) imposing a pre-determined temporal context model on the sequence of images to generate a final image classification for each image in the sequence.

10 Claims, 5 Drawing Sheets

OTHER PUBLICATIONS

Schuster, M.—"Fast online video image sequence recognition with statistical methods"—IEEE—vol. 6, May 1996, pp. 3450-3453.*

Morguet, P.—"Feature extraction methods for consistent spatio-temporal image sequence classification using hidden Markov models"—IEEE—vol. 4, Apr. 1997, pp. 2893-2896.*

Saitwal, K.—"A multichannel temporally adaptive system for continuous cloud classification from satellite imagery"—IEEE—vol. 41, May 2003, pp. 1098-1104.*

Savakis, A.—"Indoor vs outdoor classification of consumer photographs using low-level and semantic features"—IEEE—vol. 2, Oct. 2001, pp. 745-748.*

Vasconcelos, N.—"A Bayesian framework for semantic content characterization"—IEEE—Jun. 1998, pp. 566-571.*

Baik, S.—"Online model modification for adaptive texture recognition in image sequences"—IEEE—vol. 32, Nov. 2002, pp. 625-639.*

Kane, M.—"Bayesian network structure learning and inference in indoor vs. outdoor image classification"—IEEE—vol. 2, Aug. 2004, pp. 479-482.*

Sun, Y.—"MyPhotos—A system for home photo management and processing"—ACM, Dec. 2002, pp. 81-82.*

"Content-based hierarchical classification of vacation images" by A. Vailaya, M. Figueiredo, A. Jain, and H.J. Zhang. *Proceedings of IEEE International Conference on Multimedia Computing and Systems*, 1999.

"AutoAlbum: Clustering digital photographs using probabilistic model merging" by J. Platt. *IEEE Workshop on Content-based Access of Image and Video Libraries*, 2000.

"Automatic image event segmentation and quality screening for albuming applications" by Alex Loui and Andreas Savakis. *Proceedings of IEEE International Conference on Multimedia and Expo*, New York, Jul. 2000.

"Home photo retrieval: time matters", by Mulhem and Lim. *Lecture Notes in Computer Science*, 2728: 321-330, 2003.

"Learning to estimate scenes from image" by W.T. Freeman and E. Pasztor, in *Adv. Neural Information Processing Systems*,11, J.S. Kearns, S.A. Solla and D.A. Cohn, eds. MIT Press, Cambridge, MA, 1999.

"Learning low-level vision" by W.T. Freeman, E.C. Pasztor, and O.T. Carmichael, *International Journal of Computer Vision*, 40(1):24-57, Oct. 2000.

Serrano, Savakis, and Luo, *Proceedings of International Conference on Pattern Recognition*, 2002.

Li J. et al.: "Image Classification by a Two-Dimensional Hidden Markov Model" IEEE Transactions on Signal Processing, IEEE, Inc. New York, US, vol. 48, No. 2, Feb. 2000, ISSN: 1053-587X the whole document.

Jincheng Huang et al.: Joint Video Scene Segmentation and Classification Based on Hidden Markov Model, Multimedia and Expo, 2000, ICME 2000, 2000 IEEE International Conference on New York, NY, USA Jul. 30-Aug. 2, 2000, Piscataway, NJ., USA, IEEE, US, vol. 3, Jul. 30, 2000, pp. 1551-1554, XP010512802, ISBN: 0-7803-6536-4 the whole document.

Peter Morguet et al., "Feature Extraction Methods for Consistent Spatio-Temporal Image Sequence Classification Using Hidden Markov Models", Acoustics, Speech and Signal Processing, 1997. ICASSP-97., 1997 IEEE International Conference on Munich, Germany, Apr. 21-24, 1997, Los Alamitos, CA., USA, IEEE Comput. Soc. US, vol. 4, Apr. 21, 1997, pp. 2893-2896, XP010225761, ISBN: 0-8186-7919-0 the whole document.

* cited by examiner

METHOD OF USING TEMPORAL CONTEXT FOR IMAGE CLASSIFICATION

FIELD OF THE INVENTION

The invention relates generally to the field of digital image processing and, more particularly to a method for using temporal context among the input digital images to improve image classification.

BACKGROUND OF THE INVENTION

Automatically determining the semantic classification (e.g., mountain, sunset, indoor) of an arbitrary image has many useful applications. It can help consumers to organize their digital photographs into semantic categories. It can also make camera- and minilab-based digital enhancement and manipulation more powerful. Rather than applying generic enhancement algorithms (e.g., color balancing) to all images, scene knowledge can allow us to use customized, scene-specific algorithms.

Semantic scene classification has been studied much in recent years (see for example, A. Vailaya, M. Figueiredo, A. Jain, and H. J. Zhang, "Content-based hierarchical classification of vacation images", *Proceedings of IEEE International Conference on Multimedia Computing and Systems*, 1999). Most current classifiers use the low-level content (e.g., colors, textures, edges) of the image only and have achieved some success on constrained image sets (e.g., the Corel stock photo collection). However, on unconstrained consumer images, scene classification is still very much an open problem, especially when only image (e.g., pixel) information is used.

Information beyond pure scene content has only recently started to be exploited to help scene classification. An untapped source of image context lies in its temporal context: the images surrounding the image being classified. Use human behavior as an example: when humans classify a sequence of images, they tend to assume that neighboring images are related, unless the scene content changes dramatically. The reason behind such a subconscious assumption is that real-world events occur consecutively and sequentially in terms of subject, time, and location, and are recorded accordingly by the cameras. In applications involving image collections where images are clustered sequentially, surrounding images can be used as context. This is true in cases of indoor/outdoor and sunset scene classification, as well as image orientation detection.

Time and date information, if accurate, could be used to derive seasonal variations that could prime content-based object and scene detectors (e.g., sunrise, night, or snow detectors). However, this would also need to be coupled with the geographic location in which the image was captured to be accurate (e.g. time of sunrise is primarily a function of degrees longitude). While this may be possible in the future, as GPS, cellular-phone, and digital camera technology continues to merge, it is not currently available. Furthermore, many amateur photographers do not set their clocks correctly on their cameras, so absolute time information appears too unreliable to use.

Relative time information (elapsed time between photographs) has been used successfully to cluster or group photographs by events (for examples, J. Platt, "AutoAlbum: Clustering digital photographs using probabilistic model merging", in *IEEE Workshop on Content-based Access of Image and Video Libraries*, 2000, and J. Platt, M. Czerwinski, and B. Field, "PhotoTOC: Automatic clustering for browsing personal photographs", *Microsoft Research Technical Report MSR-TR*-2002-17, February, 2002.), complementing content-based clustering strategies. Loui and Savakis, in "Automatic image event segmentation and quality screening for albuming applications", Proceedings of *IEEE International Conference on Multimedia and Expo*, New York, July 2000, assumed the use of time metadata and assume that intra-event time differences are smaller than inter-event differences. This leads naturally to their event segmentation algorithm: perform 2-means clustering on the time-difference histogram. The histogram is appropriately scaled to perform meaningful clustering.

Using elapsed time is becoming more popular in related fields as well; for example, Mulhem and Lim recently used the classification of images within a cluster to improve image retrieval, in "Home photo retrieval: time matters", *Lecture Notes in Computer Science*, 2728:321-330. 2003.). Their metric for relevance between a query and a database image D incorporates both the match between the query and D, but also the best match between the query and the best-matching image in the same temporal cluster as D.

However, compared to image clustering (e.g., Loui and Savakis) and image retrieval (e.g., Mulhem and Lim), there has not been any known attempt at using temporal context in image classification, where an image is assigned to a semantic scene category. While one could use clustering as a precursor to classification, this is not necessarily the best approach, since clustering errors would propagate to the classification stage, degrading performance. Another advantage of operating without the need for clustering is that it also avoids the computational overhead of performing clustering in advance. In addition, it is advantageous to use a probabilistic framework for modeling and enforcing temporal context, as opposed to handcrafted rule-based systems such as Mulhem and Lim.

Consequently, a need exists for a method that takes advantage of temporal context to improve image classification in order to overcome the above-described issues in image classification. These issues are addressed by first classifying images in isolation using a content-based classifier, and then imposing a proper temporal context model (e.g., a Markov Chain) consisting of entire sequences of images, thereby correcting mistakes made by a content-based classifier.

SUMMARY OF THE INVENTION

The present invention is directed to overcoming one or more of the problems set forth above. Briefly summarized, according to one aspect of the present invention, the invention resides in a method for improving scene classification of a sequence of digital images comprising the steps of: (a) providing a sequence of images captured in temporal succession; (b) classifying each of the images individually based on information contained in the image alone to generate a first image classification; and (c) imposing a pre-determined temporal context model on the sequence of images to generate a final image classification for each image in the sequence.

The present invention has the advantage of correcting mistakes made by a content-based classifier and increasing the accuracy of image classification.

These and other aspects, objects, features and advantages of the present invention will be more clearly understood and appreciated from a review of the following detailed descrip-

BRIEF DESCRIPTION OF THE DRAWINGS

FIG. 3B shows (b) a "Trellis" model of the FSM unrolled over time, where the Viterbi algorithm finds the optimal path through the trellis.

DETAILED DESCRIPTION OF THE INVENTION

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine-readable computer code. Alternatively, it will be understood that the present invention may be implemented in hardware or firmware.

In a preferred embodiment of the present invention, a specific image and scene classification problem is that of indoor-outdoor classification. Such classification is useful as part of a hierarchical approach, which classifies images into "indoor" or "outdoor" at the top level and then further classifies them within each subcategory.

According to the invention, a temporal context model is used to address the above issues. A temporal context model is generally defined as a probabilistic distribution that characterizes constraints from images captured before and after a given image, whether or not the elapsed time between them is known. The goal is to use this context to obtain an optimal scene classification for a sequence of images. However, as in any classification problem, what is observed is only the output of a (in this case, content-based, e.g., color-, texture-, and/or metadata-based) classifier (for examples, Vailaya et al.). This is very similar to the problem of speech recognition, in which the true words spoken are unknown and must be inferred from an individual phoneme classifier and a Hidden Markov Model governs the transitions between phonemes to create words and sentences.

Figure 1:
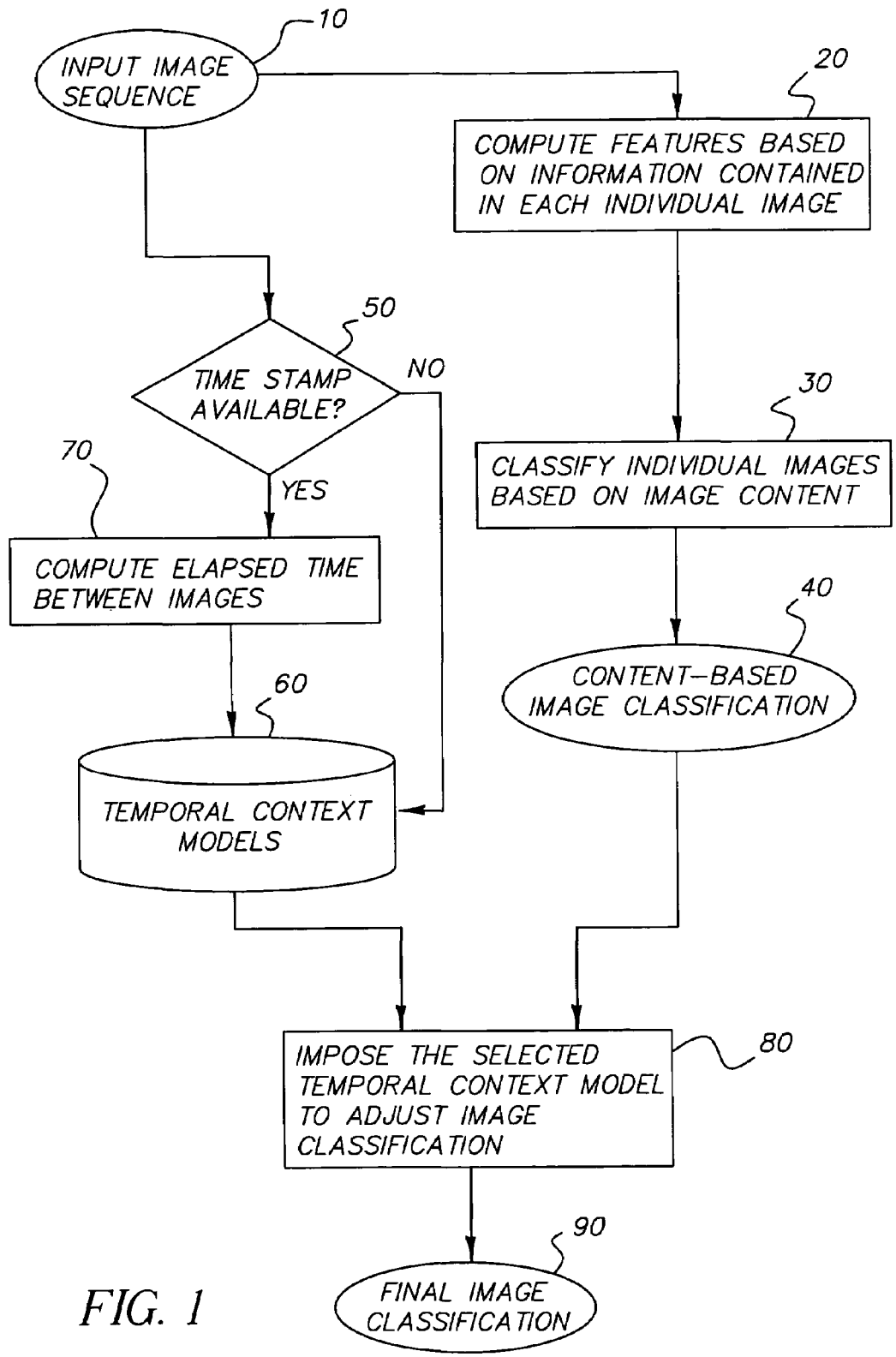
FIG. 1 is a diagram illustrating elements of a method for practicing the present invention.

FIG. 1 shows a block diagram of the method for improving the scene classification of digital images according to the invention. An input sequence of digital images (10) is obtained. First, image features based on information contained in each individual image are computed (20), which may include one or more of pixel information and metadata information embedded in the digital image. Each image is classified individually (30) based on the computed features to produce an initial content-based image classification outcome (40). At the same time, depending on whether time stamp information is available (50), a predetermined temporal context model (60) will be selected. If the time stamp information is indeed available, the elapsed time between consecutive images are computed (70) and a more sophisticated elapsed time-dependent temporal context model is selected. The details on the different temporal context models and how they are pre-determined will be discussed later. Once the proper temporal context model is selected and the initial image classification is obtained, the selected temporal context model is imposed to adjust image classification for the entire sequence (80) and produce the final image classification outcome (90).

Figure 2:
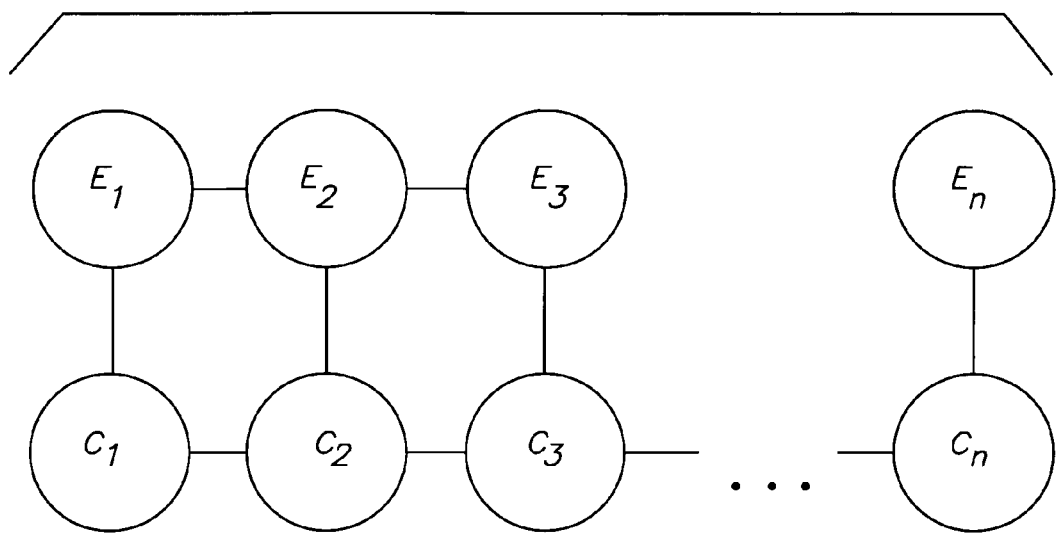
FIG. 2 shows an undirected Markov Chain as an example of a graphical model for representing temporally-related images.

Graphical models, such as Bayesian Networks, Markov Random Fields, and Hidden Markov Models, are visual representations of probabilistic models. These models represent random variables as nodes and statistical dependencies between those variables as edges. In problems such as the one at hand, in which the underlying content of an scene is to be inferred from an image, two independence assumptions are generally made: scene/observation dependence at each pixel or region, and locality (each scene node depends only on neighboring scene nodes) (for example, W. T. Freeman and E. Pasztor, "Learning to estimate scenes from images", in *Adv. Neural Information Processing Systems* 11, M. S. Kearns, S. A. Solla and D. A. Cohn, eds. MIT Press, Cambridge, Mass., 1999.). The problem at hand differs in that observations are for whole images, and the locality refers to dependence across neighboring images. However, the spirit of the assumptions is the same. First, the content-based classifier's output on an image depends only on the class of that image and no other. Second, the class of an image depends only on the class of the images immediately preceding and succeeding it, and upon no other images. This locality assumption is called the Markov property. The graphical model shown in FIG. 2 captures these assumptions.

The problem at hand is formalized as follows: let Ci be the true semantic classification (label) of image i, and C={C1, C2, ..., Cn} be a vector of the classifications of a sequence of n images arranged in temporal order. The 1st-order Markov property can be stated formally as $$P(C_i|C_j, j \neq i) = P(C_i|C_{i-1}, C_{i+1}).$$

Let M be the number of possible scene labels. Let Ei be the evidence based on image i alone for the class of image i, and E={$E_1, E_2, \ldots, E_n$} be the corresponding evidence vector. Let E denote content-based evidence. This evidence may be composed of low-level (e.g., color or texture) evidence and/or camera metadata (e.g., flash, exposure time) evidence, but we assume that both have been integrated into a single belief. Note that all the evidence must be exclusively from the individual image itself.

The goal is to maximize the probability of classifying the sequence of images correctly, given the content-based evidence and the order of each image. In the terminology of Hidden Markov Models, the classes are the (hidden) states and the evidence is the observed output. In this formalism, the goal is:

$$\arg\max P(C \mid E) = \arg\max P(E \mid C) P(C) \qquad (1)$$

$$= \arg\max \left( \prod_{i=1}^{N} P(E_i \mid C_i) \right) P(C)$$

Following the standard derivation of Markov models, the first line follows from Bayes' Rule. The second line follows from the first assumption above. P(C) can be expanded and simplified using the Markov property in various ways, as will be seen in the following sections. Finally, once expanded, it needs to be decided how to learn $P(E_i|C_i)$ and $P(C)$.

In real-time speech recognition, one usually models the prior probability P(C) using a bigram model (in which the context of each state consists of the previous state only). Using the Chain Rule successively and then applying the Markov Property for bigram models gives Equation 2. In the last line, define P(C1|C0)=P(C1) for notational convenience.

$$P(C) = P(C_N \mid C_1 \ldots C_{N-1}) P(C_1 \ldots C_{N-1}) \qquad (2)$$

$$= P(C_N \mid C_1 \ldots C_{N-1}) P(C_{N-1} \mid C_1 \ldots C_{N-2}) \ldots$$

$$P(C_2 \mid C_1) P(C_1)$$

$$= \left( \prod_{i=1}^{N} P(C_i \mid C_{i-1}) \right)$$

The assumption of this model is that the class of an image depends only on the class of the previous image in the sequence. To maximize equations (1)-(2) using a brute force algorithm requires complexity that is exponential in the number of images. However, because the conditional probabilities "flow" in one direction only, there exists an efficient dynamic programming algorithm called the Viterbi algorithm to perform the optimization (R. Duda, R. Hart, and D. Stork, *Pattern Classification*, $2^{nd}$ Edition, John Wiley and Sons, Inc., New York, 2001.). The Viterbi algorithm has complexity of only $O(M^2 N)$, where M is the number of classes and N is the number of images. For the purposes of scene classification, M is usually small (e.g., M=2 for indoor/outdoor classification).

Figure 3A:
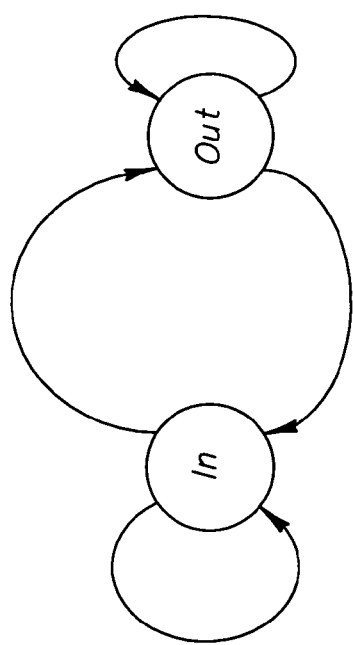
FIGS. 3A and 3B show an example inference method called the Viterbi algorithm, where FIG. 3A describes (a) a finite state machine (FSM) showing transitions
Figure 3B:
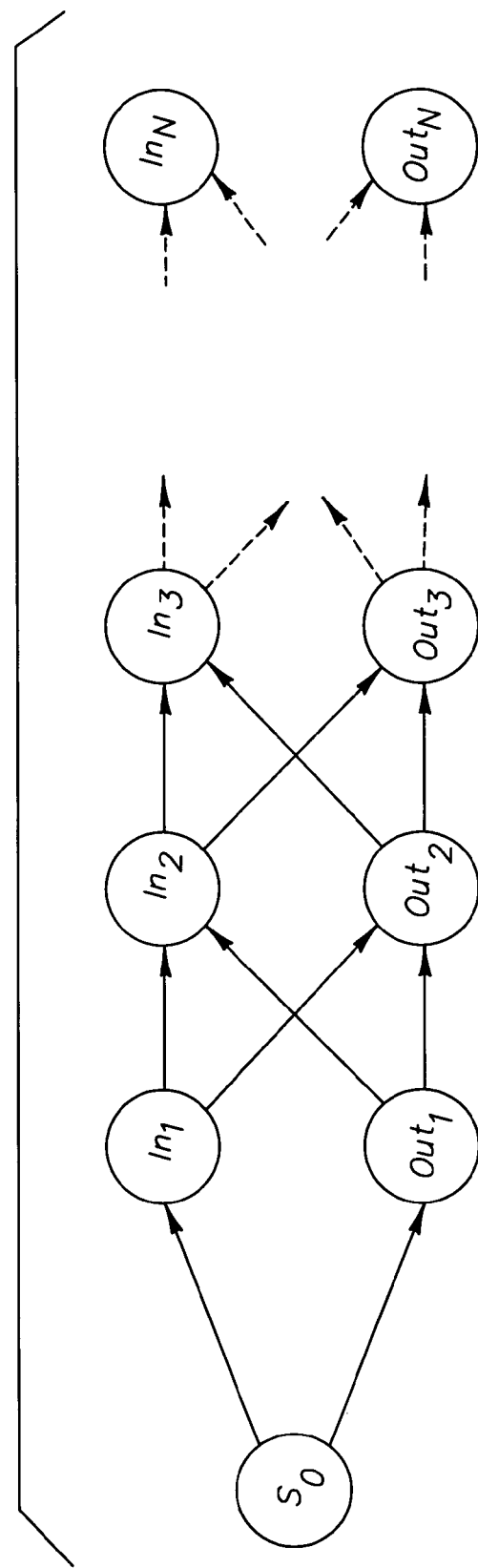

One can visualize the Viterbi algorithm by a finite state machine (FSM; FIG. 3a), which shows the transitions between states. The two-class problem, indoor-outdoor scene classification, is used as an example for clarity. Each transition has a probability $P(C_i|C_{i-1})$ associated with it, and each state has an output probability $P(E_i|C_i)$. Perhaps more useful is to expand the FSM into a "trellis" (FIG. 3b).

The Viterbi algorithm iterates through the list in a forward manner, keeping track of, for each state, the optimal path (maximal probability) to that state from the start. The efficiency is gained because the optimal path to any state Si must contain one of the optimal paths to state $S_{i-1}$, causing only local computations at each node.

The optimization may be viewed as a struggle between the strengths of the transition probabilities and those of the output probabilities. We make a physical analogy using the trellis of FIG. 3b. Treat each node as a nail hammered into sand with strength proportional to its output probability and treat each link between nodes as an elastic stretching between the nails with tension proportional to the strength of the transition probability (where, e.g., the "strength" of a probability, p, is the ratio p/(1−p)).

Markov networks, in the form of Markov Random Fields (MRFs), enjoy favor in the computer vision community for problems of inferring scenes from images (e.g., Freeman). However, a 2D grid containing loops (as opposed to a simple chain) must be used, for which no exact inference algorithms exist. Recently, Freeman developed a message-passing algorithm that successfully ignores these loops (and is exact in topologies without loops), see W. T. Freeman, E. C. Pasztor, and O. T. Carmichael, "Learning low-level vision", *International Journal of Computer Vision*, 40(1):24-57, October 2000. In this scheme, the messages passed in opposite directions but do not interfere.

In belief propagation, each node (image) calculates its own Maximum a Posteriori (MAP) estimate of the scene class. The factorization of P(C) is different for each node; the derivation for node i is as follows.

$$P(C) = P(C_i) P(C_1 \ldots C_{i-1}, C_{i+1} \ldots C_N \mid C_i) \qquad (3)$$

$$= P(C_i) P(C_1 \ldots C_{i-1} \mid C_i) P(C_{i+1} \ldots C_N \mid C_i)$$

$$= P(C_i) \left( \prod_{k=2}^{i} P(C_{k-1} \mid C_k) \right) \left( \prod_{k=i}^{N-1} P(C_{k+1} \mid C_k) \right)$$

This corresponds to the following message passing algorithm for the MAP estimate at node j (details can be found in Freeman, 1999). Express it in the form used for our chain topology:

$$\arg\max_{\bar{x}_j} P(C_j) P(E_j|C_j) L_{(j-1)j}(C_j) L_{(j+1)j}(C_j) \qquad (4)$$

P(Cj) is the prior on image j, P(Ei|Ci) are the same output probabilities used in the Viterbi algorithm, and the likelihood messages Lkj(xj) from node k to node j about scene class Cj are calculated using:

$$L_{kj}(C_j) = \max_{C_k} p(C_k|C_j) p(E_k|C_k) \tilde{L}_{lk} \qquad (5)$$

where the $\tilde{L}$ are the messages from the previous iteration (initially all set to 1). Messages are passed until the MAP estimates converge. Because the topology contains no loops, it is guaranteed to converge in at most N steps.

The graphical model requires two types of probabilities: output probabilities and transition probabilities. Output probabilities (e.g., $P(E_i|C_i)$) give the relative likelihoods of observing the evidence, given the true scene class. Transition probabilities (e.g., $P(C_i|C_{i-1})$), give the relative likelihoods of an scene having a class label, given the label of another scene. Each of these probabilities can be either set by an expert or learned from data. In the preferred embodiment of the present invention, they are learned from data (but understood that they are intuitive enough to be fine-tuned by experts).

Output probabilities $P(E_i|C_i)$ are related to the output of the content-based classifier. For example, the indoor-outdoor, color/texture-based SVM classifier (see Serrano, Savakis, and Luo, *Proceedings of International Conference on Pattern Recognition*, 2002) outputs a real number which is shaped by a sigmoid function into a pseudo-probability that the image is outdoor. This is $P(C_i|E_i)$. This can be converted into the desired $P(E_i|C_i)$ using one of two techniques.

The first is to discretize the output into intervals, and learn statistics about these intervals. For the indoor/outdoor classifier, if one thresholds the belief at 0.05, 0.5, and 0.95, for example, one gets four intervals, strong indoor<0.05, 0.05<weak indoor<0.5, 0.5<weak outdoor<0.95, and 0.95<strong outdoor. Typical statistics $P(E_i|C_i)$ are given in Table 1:

TABLE 1

Typical discretized output probabilities $P(E_i|C_i)$ learned from data set.

| True Class (C) | Evidence (E) | | | |
|---|---|---|---|---|
| | Strong Indoor | Weak Indoor | Weak Outdoor | Strong Outdoor |
| Outdoor | 0.045 | 0.175 | 0.230 | 0.550 |
| Indoor | 0.440 | 0.392 | 0.145 | 0.023 |

These translate into likelihood ratios for the true class when the evidence is observed (e.g., if evidence E is strong outdoor, then P(indoor|E):P(outdoor|E)=0.55:0.023=24:1). While this method is simple, its drawback is that the intervals are coarse, and gives undesirable behavior near the thresholds (e.g., likelihood ratio jumps from 2:1 to 24:1 if belief changes from 0.94 to 0.96; this jump is not warranted given the smooth nature of the sigmoid). Of course, finer intervals can be used, but that requires more training data to be used to obtain an accurate estimate of the probabilities.

The second technique to infer $P(E_i|C_i)$ from $P(C_i|E_i)$ is to use the same techniques used by Bayesian networks: conditional probability matrices (CPMs) representing the relationships between two nodes. In this case, consider that the content-based evidence to be uncertain or fuzzy input, with probability $P(E_i)$.

For example, one might believe the content-based detector to be 90% accurate on both indoor and outdoor scenes. This translates into p(C=indoor|E=indoor)=p(C=outdoor|E=outdoor)=0.9. Then the likelihood p(C=indoor|E) is calculated as $$\sum_i p(C=\text{indoor}|E_i)p(E_i);$$

in this problem, this is p(C=indoor|E=indoor)p(E=indoor)+p(C=indoor|E=outdoor)p(E=outdoor). If the detector gives belief in indoor to be 0.3, then p(indoor|E)=(0.9)(0.3)+(0.1)(0.7)=0.34. Similarly, p(outdoor|E)=(0.1)(0.3)+(0.9)(0.7)=0.66. This gives a likelihood ratio of 0.34:0.66, or roughly 1:2. If the belief changes slightly to 0.31, then the ratio changes to 0.348:0.652, slightly higher, but still close to the original ratio. This eliminates the drawback of the discretization method. Another advantage of this method is that an expert can modify the CPM to reflect the relative strength of the content-based evidence vs. the strength of the temporal context prior. This parameter is called content-based strength (CBS).

The transition probabilities, $P(C_i|C_j)$, model temporal context between images. In essence, they govern the strength of class expectation between neighboring images. For example, if an image is both preceded by and succeeded by indoor scenes, one would certainly expect that it, too, is of an indoor scene. Learning these probabilities is fairly straightforward. Take the bigram model $P(C_i|C_{i-1})$ as an example: Given a labeled training set, one can count the number of each pair of possible classes. For example, from a data set consisting of over 100 sequences of images, one obtained 111 indoor to outdoor transitions, 106 outdoor to indoor, 1358 indoor to indoor, and 1075 outdoor to outdoor. One can then divide to obtain the appropriate probabilities, shown in Table 2. Note that indoor and outdoor probabilities are not symmetric due to the fact that they have different priors (0.6 vs. 0.4).

TABLE 2

Transition probabilities learned from data set.

| | $C_i$ | |
|---|---|---|
| $C_{i-1}$ | Indoor | Outdoor |
| Indoor | 0.924 | 0.076 |
| Outdoor | 0.099 | 0.901 |

A framework that models temporal context using these transition probabilities is expected to improve scene classification of a sequence. However, an integral part of this work rests on the following observation: "Transition strength between two images depends on the elapsed time between them", which is elaborated below.

Two adjacent images captured seventeen seconds apart are almost guaranteed to be of the same event, while ones captured three weeks apart are extremely likely to be unrelated. This prompts us to determine the effects of elapsed time on the transition probabilities.

In the present invention, it is hypothesized that the strength of the transition drops off exponentially. Therefore, while learning statistics, time intervals that increased exponentially in length are used. This also mitigated the fact that the bins contain a monotonically decreasing number of images per bin. In the preferred embodiment of the present invention, the following sequence of 8 bins are used, in which the bin boundaries increase by factors of 3: 0-30 seconds, 30-90 seconds, 90 seconds-4.5 minutes, 4.5-13.5 minutes, 13.5-40.5 minutes, 40.5 minutes-2.025 hours, 2.025 hours-6.075 hours, and above 6.075 hours. After 6 hours, the data became much more sparse (and thus probably much more noisy).

Figure 4:
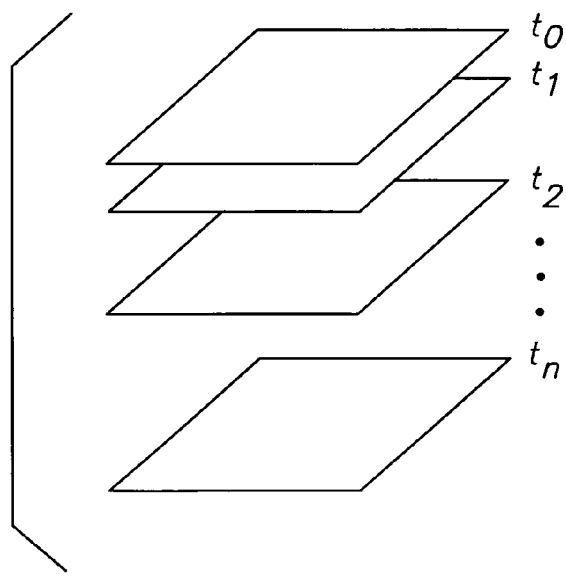
FIG. 4 shows a graphical illustration of an elapsed time-dependent temporal context model, where the transition probabilities used between two images are a function of the elapsed time between them.

The transition probabilities can be visualized as a three-dimensional matrix, in which the added dimension is time (FIG. 4). Each plane of the matrix is a 2-dimensional matrix in the form of Table 2 giving the transition probabilities learned from pairs of images separated by a given time interval. As stated, the strength of the transitions is expected to drop over time, asymptotically approaching the prior probabilities of each class.

The elapsed time-dependent temporal context models can be built from this data for use in inference. Each pair of adjacent images in a test sequence has an associated elapsed time $T_i$ between them. There are three choices regarding how to use T. The simplest is to discretize T using the same bins used in training, thus obtaining the transition matrices by indexing into the 3D matrix in FIG. 4. The second is to consider the planes to be discrete snapshots of time intervals, represented by their centroid (or some variant, given the exponential nature of time intervals). Interpolation between the planes is then used to obtain the transition probabilities. This method may be more precise if there is a large difference between transition probabilities in adjacent bins (assuming that the transition probabilities change smoothly over elapsed time). The third is to model the decrease in transition strength using a continuous function, e.g., an exponential curve fit to the data. This may be most helpful if the data is noisy, and may generalize the best. However, in the preferred embodiment of the present invention, the first option is chosen due to its simplicity and faithfulness to the data.

Ignoring elapsed time, one can obtain the bigram transition probabilities shown earlier in Table 2. Transition probabilities between an image and both of its neighbors are shown in Table 3.

TABLE 3

Two-sided transition probabilities learned from data set D1.

| ($C_{i-1}$, $C_{i-1}$) | $C_i$ | |
| --- | --- | --- |
| | Indoor | Outdoor |
| (Indoor, Indoor) | 0.983 | 0.017 |
| (Indoor, Outdoor) | 0.534 | 0.466 |
| (Outdoor, Indoor) | 0.509 | 0.491 |
| (Outdoor, Outdoor) | 0.021 | 0.979 |

These probabilities confirm the intuition: images with neighboring images of the same class have a high probability of also belonging to that class as well, while those with neighboring images of different classes have roughly equal probability of belonging to either.

Considering elapsed time, one can obtain the probabilities shown in Table 4.

TABLE 4

Elapsed-time dependent transition probabilities learned from data set D1. Note the trend towards the prior probability as the elapsed time increases.

| Time Interval | nImages | $P(C_i =$ in$\|C_{i-1}=$ in) | $P(C_i =$ out$\|C_{i-1} =$ out) | $P(C_i =$ in$\|C_{i+1} =$ in) | $P(C_i =$ out$\|C_{i+1} =$ out) |
| --- | --- | --- | --- | --- | --- |
| 0-30 s | 1040 | 0.994 | 0.985 | 0.991 | 0.990 |
| 30-90 s | 528 | 0.973 | 0.974 | 0.973 | 0.974 |
| 90 s-4.5 m | 260 | 0.933 | 0.952 | 0.954 | 0.930 |
| 4.5 m-13.5 m | 145 | 0.847 | 0.849 | 0.847 | 0.849 |
| 13.5 m-40.5 m | 109 | 0.897 | 0.863 | 0.881 | 0.880 |
| 40.5 m-2.025 h | 98 | 0.803 | 0.757 | 0.845 | 0.700 |
| 2.025-6.075 h | 62 | 0.697 | 0.621 | 0.676 | 0.643 |
| 6.075 + h | 314 | 0.707 | 0.455 | 0.738 | 0.417 |

As expected, the strength of the probabilities diminishes as the elapsed time between images increases. Because there are more indoor than outdoor images, the probabilities are not symmetric. Furthermore, the backward (columns 3-4) transition probabilities differ from the forward ones (columns 5-6) due to boundary artifacts from the 132 sequences; if one learned these probabilities from a single sequence of images, they should be identical.

Figure 5:
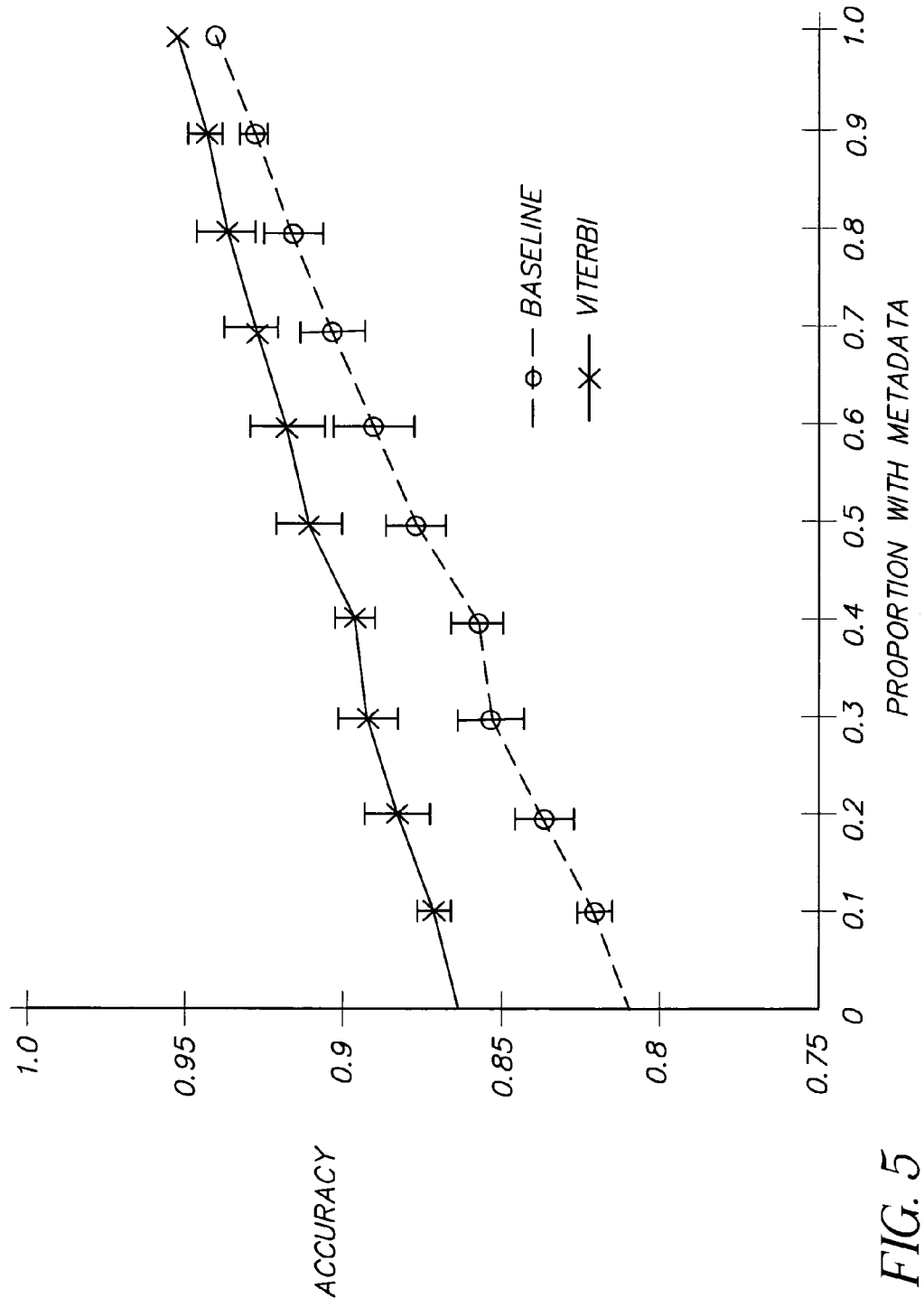
FIG. 5 shows an example of the effect of the present invention in terms of accuracy of a baseline system and that of the temporal context model-based system for a range of percentage of sequences containing metadata. The error bars correspond to 1 standard deviation. The bars do not overlap, showing that the increase in accuracy is statistically significant.

Algorithms designed to improve the accuracy of other algorithms have a bigger impact when the baseline is lower (as temporal context caused increases ranging from 1-6% depending on the actual content-based cues used). FIG. 5 shows the accuracy of both the baseline and the temporal content model. The simulation was executed 20 times for each control point so that variance could be calculated (the error bars in the Figure correspond to 1 standard deviation). The accuracy of the context model is consistently higher (as evidence by the non-overlapping error bars), indicating that the increase is statistically significant.

Figure 6:
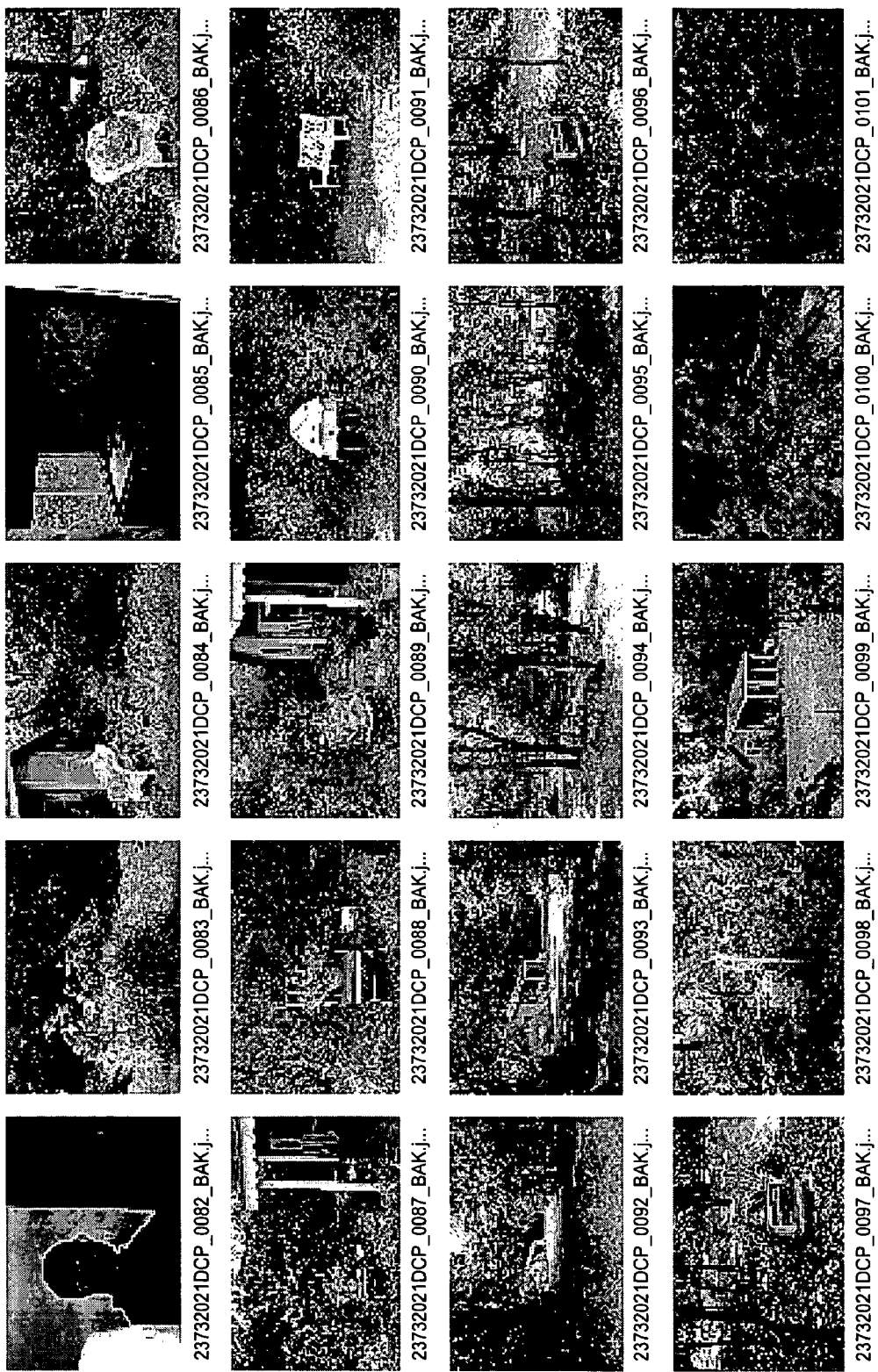
FIG. 6 shows an example sequence of images and the effect of the present invention.

FIG. 6 shows an example sequence and the effect of the present invention. There are images (such as close-up photos) that, when viewed in isolation by human observers, are ambiguous as to their classification. However, humans can often use context to disambiguate them. The temporal context model was able to achieve the same effect. The close-up of flowers (0100) is such a case.

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

The temporal context models and their uses described by the present invention are not limited to photographic images. For example, spatial recomposition can also be applied to medical images for medical image classification.

The present invention describes two temporal context models of between-image transitions. One uses their elapsed time, such as can be derived from digital camera timestamps. The other uses sequence information only, as would be the case with film orders, in which only the relative order of images is known. Experiments confirmed the intuition that richer information increases performance more.

The Viterbi and belief propagation algorithms give very comparable results on most images. In fact, the Viterbi algorithm is a special case of the belief propagation algorithm. As can be seen in Equations 2 and 3, the factorization of P(C) is the only difference between the two, and differs only in the direction of the bigram probabilities and the priors used. The Viterbi algorithm, due to its sequential nature, only uses the prior of the first image in the sequence to classify the sequence. In contrast, belief propagation classifies each image in the sequence using that image's prior. In the case of equal class priors and symmetric transition probabilities, the algorithms will give identical results (if belief propagation runs fully: for a number of iterations equal to the number of images in the sequence). Our transition probabilities are close to symmetric, but the priors are not equal (p(indoor)=0.574)).

The invention has been described in detail with particular reference to certain preferred embodiments thereof, but it will be understood that variations and modifications can be effected within the spirit and scope of the invention.

| PARTS LIST | |
| --- | --- |
| 10 | input image sequence |
| 20 | compute features based on information contained in individual image step |
| 30 | classify individual images based on image content step |
| 40 | content-based image classification outcome |
| 50 | check time stamp availability step |
| 60 | temporal context models |
| 70 | compute elapsed time between images step |
| 80 | impose the selected temporal context model step |
| 90 | final image classification outcome |

What is claimed is:

1. A method for improving scene classification of a sequence of digital images comprising the steps of:
   (a) providing a sequence of images captured in temporal succession, at least two pairs of consecutive images in the sequence of images having different elapsed times between their capture;
   (b) classifying, with a programmed digital computer, each of the images individually based on information contained in the individual image to generate an initial content-based image classification for each of the images;
   (c) generating, with a programmed digital computer, a final image classification for each image based at least on the respective initial content-based image classification and a pre-determined temporal context model that considers at least the temporal succession of the sequence of images; and (d) storing the final image classifications in a computer readable storage medium, wherein the classifying of step (b), and the final image classification classify images into one of a predetermined number of classes M, and wherein M is greater than or equal to two.

2. The method as claimed in claim 1 wherein the information used in step (b) includes pixel information.

3. The method as claimed in claim 1 wherein the information used in step (b) includes capture-device-generated metadata information.

4. The method as claimed in claim 1 wherein the pre-determined temporal context model in step (c) is independent of elapsed time between consecutive images.

5. The method as claimed in claim 1 wherein the pre-determined temporal context model in step (c) is dependent on elapsed time between consecutive images in the sequence.

6. The method as claimed in claim 1 wherein the pre-determined temporal context model is a causal Hidden Markov Model dependent on a previous image.

7. The method as claimed in claim 1 wherein the pre-determined temporal context model is a non-casual model dependent on both a previous image and a subsequent image.

8. The method as claimed in claim 1 wherein the temporal context model is imposed using Viterbi algorithm.

9. The method as claimed in claim 1 wherein the temporal context model is imposed using a belief propagation algorithm.

10. The method as claimed in claim 1 wherein the pre-determined temporal context model in step (c) is dependent on elapsed time between consecutive images in the sequence, such that different elapsed times between a particular pair of consecutive images produces a different final image classification for a later-captured image of the particular pair of consecutive images.

* * * * *